US012353822B2

(12) United States Patent
Walters et al.

(10) Patent No.: US 12,353,822 B2
(45) Date of Patent: *Jul. 8, 2025

(54) METHODS AND SYSTEMS FOR GENERATING ALTERNATIVE CONTENT

(71) Applicant: Capital One Services, LLC, McLean, VA (US)

(72) Inventors: Austin Walters, Savoy, IL (US); Vincent Pham, Seattle, WA (US); Galen Rafferty, Mahomet, IL (US); Alvin Hua, McLean, VA (US); Anh Truong, Champaign, IL (US); Ernest Kwak, Urbana, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,447

(22) Filed: Jun. 27, 2024

(65) Prior Publication Data

US 2024/0354489 A1  Oct. 24, 2024

Related U.S. Application Data

(63) Continuation of application No. 18/058,679, filed on Nov. 23, 2022, now Pat. No. 12,026,451, which is a continuation of application No. 17/215,125, filed on Mar. 29, 2021, now Pat. No. 11,550,991.

(51) Int. Cl.
*G06N 3/08* (2023.01)
*G06F 40/14* (2020.01)
*G06F 40/205* (2020.01)

(52) U.S. Cl.
CPC ............ *G06F 40/14* (2020.01); *G06F 40/205* (2020.01); *G06N 3/08* (2013.01)

(58) Field of Classification Search
None
See application file for complete search history.

(56) References Cited

U.S. PATENT DOCUMENTS

| 10,043,109 | B1* | 8/2018 | Du ......................... G06F 18/22 |
| 10,387,029 | B2* | 8/2019 | Butcher .................. G06F 3/016 |
| 10,915,243 | B2* | 2/2021 | Missig ............... G06F 3/04842 |
| 11,550,991 | B2* | 1/2023 | Walters .................... G06N 3/08 |
| 12,026,451 | B2* | 7/2024 | Walters .................. G06F 40/14 |
| 2019/0034976 | A1* | 1/2019 | Hamedi ............. G06Q 30/0243 |
| 2019/0349619 | A1* | 11/2019 | Hou ....................... G06N 3/08 |
| 2020/0021873 | A1* | 1/2020 | Swaminathan ...... H04N 21/466 |
| 2020/0021888 | A1* | 1/2020 | de Mello Brandao ..................... H04N 21/8456 |
| 2020/0097727 | A1* | 3/2020 | Stumpe ................ G02B 21/361 |
| 2020/0143265 | A1* | 5/2020 | Jonnalagadda ........ G06N 3/045 |

(Continued)

*Primary Examiner* — Maikhanh Nguyen
(74) *Attorney, Agent, or Firm* — Foley & Lardner LLP

(57) ABSTRACT

Methods and systems for using a generative adversarial network to generate personalized content in real-time as a user accesses original content. The methods and systems perform the generation through the use of an application programming interface ("API") layer. Using the API layer, the methods and systems may generate alternative content as a user accesses original content (e.g., a website, video, document, etc.). Upon receiving this original content, the API layer access the generative adversarial network to create personalized alternative content.

20 Claims, 5 Drawing Sheets

(56) References Cited

U.S. PATENT DOCUMENTS

| | | | | |
|---|---|---|---|---|
| 2020/0166670 A1* | 5/2020 | Zass | ................ | G06V 20/40 |
| 2020/0242774 A1* | 7/2020 | Park | ................ | G06N 3/084 |
| 2020/0243094 A1* | 7/2020 | Thomson | ............ | G10L 15/28 |
| 2021/0174020 A1* | 6/2021 | Sohn | ................ | G06F 40/56 |
| 2022/0114326 A1* | 4/2022 | Bedi | ................ | G06F 40/106 |
| 2022/0164153 A1* | 5/2022 | Zavesky | .......... | H04N 21/4622 |
| 2022/0198721 A1* | 6/2022 | Melnik | .............. | G06T 11/00 |

* cited by examiner

METHODS AND SYSTEMS FOR GENERATING ALTERNATIVE CONTENT

CROSS-REFERENCE TO RELATED APPLICATION

This application is a continuation of U.S. patent application Ser. No. 18/058,679, filed Nov. 23, 2022 (now U.S. Pat. No. 12,026,451), which is a continuation of U.S. patent application Ser. No. 17/215,125, filed Mar. 29, 2021 (now U.S. Pat. No. 11,550,991). The content of the foregoing application is incorporated herein in its entirety by reference.

FIELD OF THE INVENTION

The invention relates to generating alternative content using generative adversarial networks implemented in an application programming interface layer.

BACKGROUND

In recent years, users are increasingly receiving content on numerous different platforms. Moreover, users are increasingly accessing this content through different channels. However, these increases in both available content and its accessibility creates issues for generating personalized content for users.

SUMMARY

Methods and systems are described herein for generating personalized content. For example, users increasingly steer themselves towards more personalized content and content providers are increasingly attempting to personalize content for users. Conventional methods of generating personalized content relied on tracking users and then providing one pre-generated piece of content from a plurality of pre-generated pieces of content. However, as the amount of content increases, and users routinely access the content using different devices, the pre-generation of so many variations of content becomes attenable. To overcome this problem, the methods and systems describe a way to generate alternative content that is personalized to a user in real time.

Specifically, the methods and systems use a generative adversarial network to generate personalized content in real time as a user accesses original content. The methods and systems perform the generation through the use of an application programming interface ("API") layer. Using the API layer, the methods and systems may generate alternative content as a user accesses original content (e.g., a website, video, document, etc.). Upon receiving this original content, the API layer accesses the generative adversarial network to create personalized alternative content. To provide this approach, the methods and systems overcome several technical hurdles. First, in order to limit the amount of original content that is required to be processed, the methods and systems first break the content into sections. The methods and systems then determine which section of content is likely to be of interest to the user. Upon determining the section of interest, the methods and systems create a content map of the section and identify the key content characteristics (e.g., keywords, phrases, objects, images, etc.) that are the basis for alternative content. Using the content characteristics and metadata describing these characteristics, the methods and systems create a feature input for the generative adversarial network. The generative adversarial network creates alternative content characteristics, which may be included into the content mapping. By basing the feature input on the content characteristics and metadata describing these characteristics for only the section of content and then repopulating the content map for the section, the amount of processing required for the generative adversarial network is reduced (e.g., allowing for real-time generation of alternative content).

Second, in many instances, alternative content may include a mix of both textual and image data (and/or other types of data). However, this mixture may create issues for the generative adversarial network. Accordingly, the methods and systems use specialized architectures and training strategies that allow for text to image synthesis and vice versa. For example, the system may train on a subset of training categories (e.g., subsets within various categories of data), wherein the subsets are linked to specific characteristics (e.g., section and/or content characteristics). The system may include a generator and discriminator that compete in a two player minimax game for each of the subsets of training categories. The system may then combine the results of this training to create overall alternative content. Finally, the system may perform a final verification that the initial section characteristics (e.g., the characteristic that made the section of interest to the user) is preserved. Upon verification, the system may generate the alternative content for the user.

In some aspects, methods and systems for generating alternative content using generative adversarial networks implemented in an application programming interface layer are described. For example, the system may receive content for display, in a user interface of a user device, to a user, wherein the content includes a plurality of sections. The system may identify a section of the plurality of sections as having a section characteristic, wherein the section characteristic is indicative of the section being of interest to the user. The system may parse the section for a content characteristic and metadata describing the content characteristic. The system may generate a content map for the section based on the parsing, wherein the content map indicates a position of the content characteristic in the section. The system may generate a feature input based on the content map and the metadata. The system may input the feature input into a generative adversarial network, wherein the generative adversarial network is trained to generate an output of an alternative section, wherein the alternative section corresponds to the content map and has an alternative content characteristic at the position. The system may generate for display, in the user interface of the user device, the alternative section, wherein the alternative section replaces the section in the plurality of sections of the content.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1A:
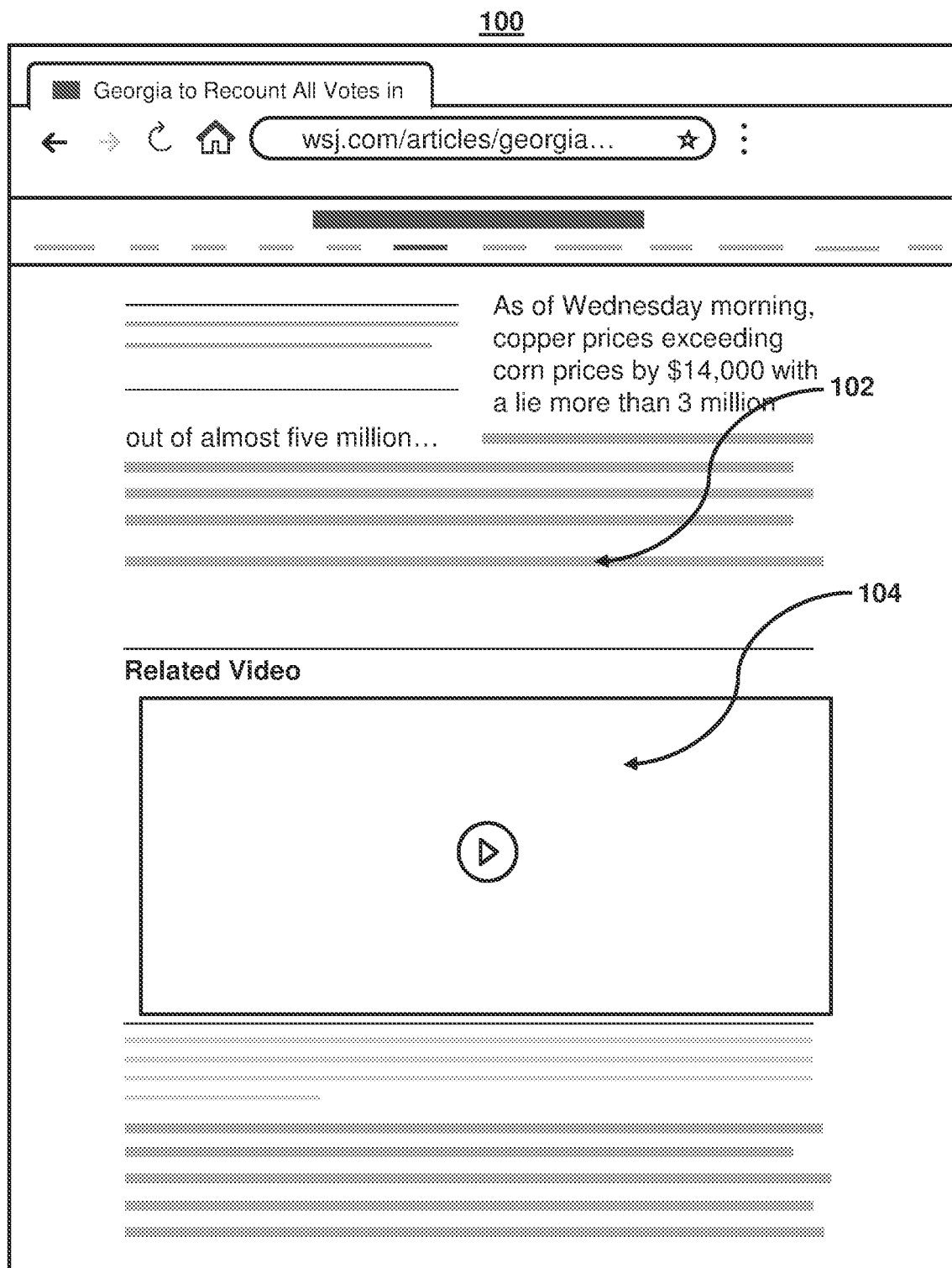
FIGS. 1A-B show illustrative user interfaces displaying generated alternative content, in accordance with one or more embodiments.
Figure 1B:
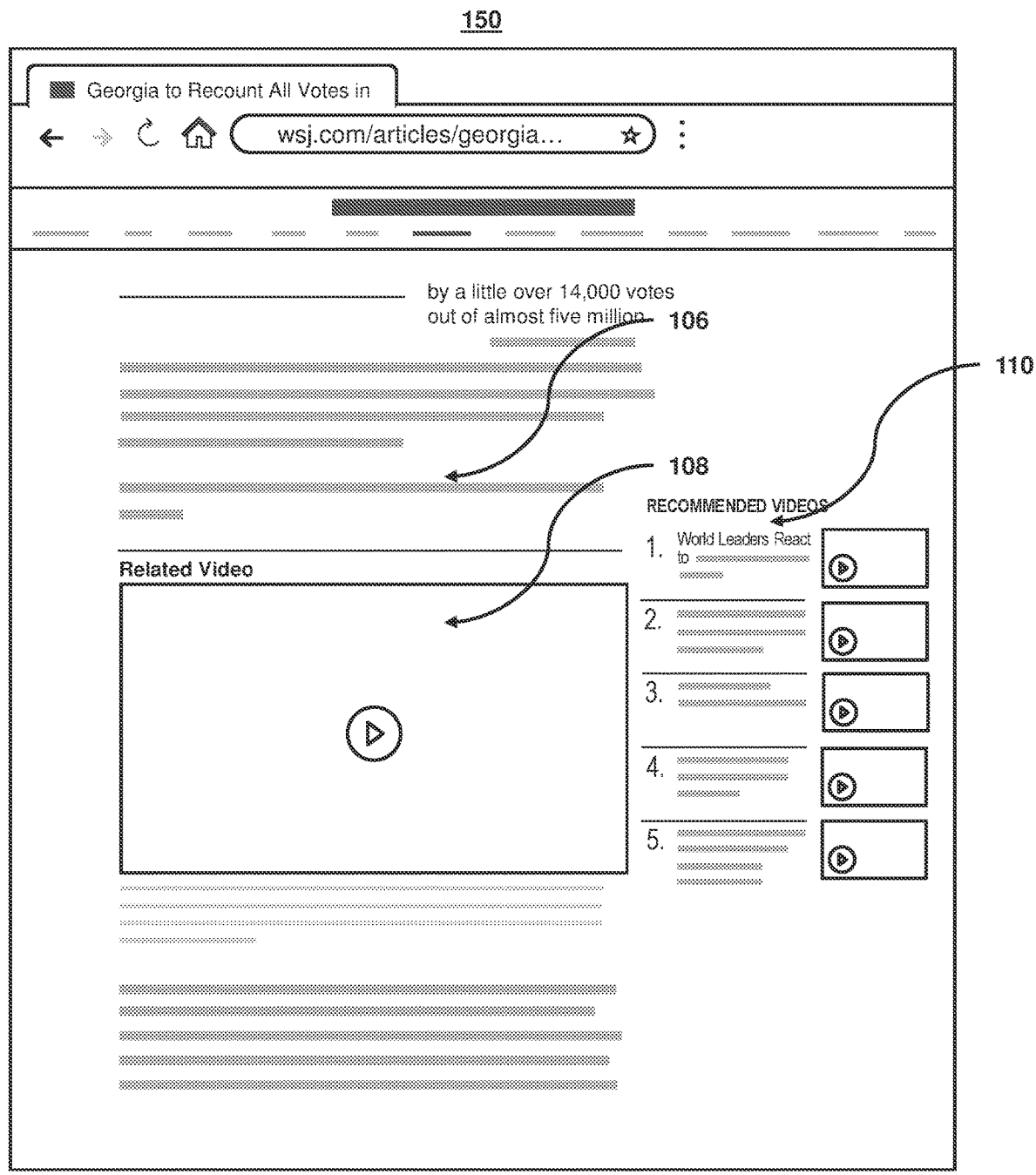

FIGS. 1A-B show illustrative user interfaces displaying generated alternative content, in accordance with one or more embodiments. For example, FIG. 1A shows a user interface (e.g., of a web browser) featuring original content (e.g., content published in its native form by a content provider). FIG. 1B shows a user interface (e.g., of a web browser) featuring alternative content (e.g., content published in its native form by the content provider with alternative section replacing and/or interwoven with the original content). For example, user interface 100 may comprise content received for display, in a user interface of a web browser on a user device, to a user.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

In some embodiments, alternative content may be personalized for a user based on the original content and user preferences (e.g., as stored in a user profile). A user profile may be a directory of stored user settings, preferences, and information for the related user account. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

FIG. 1A shows user interface 100. User interface 100 includes content having a plurality of sections. As referred to herein, a "section" may comprise any of the more or less distinct parts into which something the content may be divided or from which the content is made up. For example, a section may be distinguished from another section by one or more section characteristics. In user interface 100, the system may identify a section of the plurality of sections as having a section characteristic.

A section characteristic may comprise any characteristic that distinguishes one section from another. For example, a section characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, user interface 100 may include section 102. The system may identify section 102 based on a paragraph, section break, and/or an HTML tag. The system may parse the section for a content characteristic (e.g., content characteristic) and metadata describing the content characteristic, wherein the metadata indicates a context of the content characteristic, and wherein the content characteristic comprises human-readable text. For example, as shown in user interface 100, the system may identify content characteristic 104. As referred to herein, a "content characteristic" may comprise any of the more or less distinct parts into which something the section may be divided or from which the section is made up. For example, a content characteristic may be anything that may distinguish one content characteristic from another. In some embodiments, content characteristic may be human-readable text. For example, the content characteristic may be a keyword, an image, an embedded object, etc.

The system may generate a content map for the section based on the parsing, wherein the content map indicates a position of the content characteristic in the section. For example, the content map may include each content characteristic of a given section with the distances and/or positions indicated. For example, the system may determine a CSS position property for each characteristic. In another example, the system may use HTML absolute positioning to define a content map.

The system may then generate a feature input based on the content map and the metadata, wherein the feature input comprises a vector array of values indicative of the content map and the metadata. For example, the system may use a generative adversarial network, wherein the generative adversarial network is trained to generate outputs of alternative sections, wherein the alternative sections correspond to content maps and have alternative content characteristics at predetermined positions.

FIG. 1B shows user interface 150. User interface 150 includes content having a plurality of sections similar to user interface 100. In user interface 150, the system may replace a section from the original content (e.g., section 102) with another section (e.g., alternative section 106). For example, as described below, the system may replace a section of the original content with an alternative section. For example, the system may input the feature input into a generative adversarial network, wherein the generative adversarial network is trained to generate an output of an alternative section (e.g., alternative section 106), wherein the alternative section corresponds to the content map and has an alternative content characteristic at the position. For example, alternative section 106 may correspond to section 102), but with alternative content characteristic 108 replacing content characteristic 104. User interface 150 also shows additional alternative section 110, which is a section not included in the original content. Alternative section 110 may be located at a point outside the original content map, but the system may be anchored to alternative section 106. In some embodiments, the system may generate for display alternative section 106 and alternative section 110 simultaneously.

Figure 2:
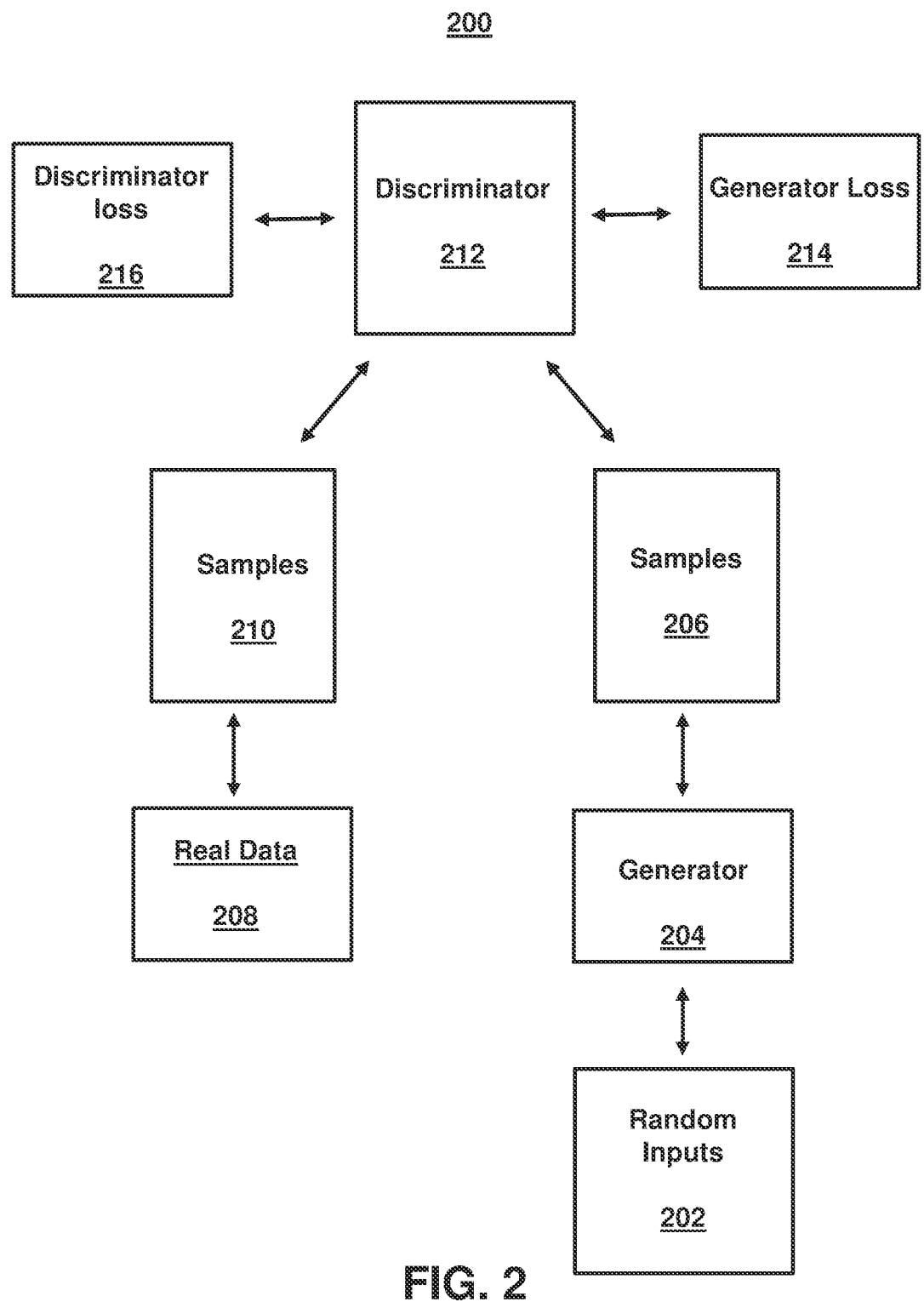
FIG. 2 shows an illustrative system diagram for generative adversarial networks for generating alternative content, in accordance with one or more embodiments.

FIG. 2 shows an illustrative system diagram for generative adversarial networks for generating alternative content, in accordance with one or more embodiments. For example, FIG. 2 comprises system 200. System 200 may be used to generate alternative content using generative adversarial networks implemented in an application programming interface layer. System 200, which may comprise a generative adversarial network, may include various objects. For example, system 200 may include random inputs 202, which are fed into generator 204 to generate samples 206. Similarly, real data 208 may generate samples 210. Samples 206 and samples 210 may be fed into discriminator 212. Outputs from discriminator 212 may include discriminator loss 216 and generator loss 214.

For example, in system 200 both generator 204 and discriminator 212 may be neural networks. Generator 204 outputs may be connected directly to an input for discriminator 212. Through backpropagation, a classification from discriminator 212 provides a signal that generator 204 uses to update its weights. The back-propagation may comprise fine-tuning the weights system 200 (and/or generator 204 or discriminator 212) based on the error rate obtained in the previous epoch (i.e., iteration). Proper tuning of the weights allows system 200 to reduce error rates.

For example, generator 204 may generate new data instances. Discriminator 212 discriminates between different kinds of data instances. A generative adversarial network is a type of generative model. For example, given a set of data instances X and a set of labels Y, generator 204 may capture the joint probability p(X, Y), or just p(X) if there are no labels, whereas discriminator 212 captures the conditional probability p(Y|X).

Discriminator 212 may be a classifier that distinguishes real data (e.g., samples 210) from the data created by generator 204 (e.g., samples 206). For example, discriminator 212 may use samples 210 as positive examples during training. Discriminator 212 may use samples 210 as negative examples during training. In system 200, discriminator 212 connects to two loss functions (e.g., discriminator loss 216 and generator loss 214). During discriminator 212 training, discriminator 212 ignores generator loss 214 and uses discriminator loss 216.

During discriminator 212 training, discriminator 212 classifies both real data and fake data from generator 204. Discriminator loss 216 penalizes discriminator 212 for misclassifying a real instance (e.g., samples 210) as fake or a fake instance (e.g., samples 206) as real. Discriminator 212 updates its weights through backpropagation from discriminator loss 216 through the discriminator network. Generator 204 of system 200 learns to create fake data by incorporating feedback from discriminator 212 (e.g., it learns to make discriminator 212 classify its output as real). In some embodiments, generator 204 training requires tighter integration between generator 204 and discriminator 212 than discriminator training requires. For example, system 200 trains generator 204 using random inputs 202.

As generator 204 improves with training, discriminator 212 performance gets worse because discriminator 212 cannot easily tell a difference between samples 210 and samples 206. If generator 204 succeeds, then discriminator 212 may have a 50% accuracy. Accordingly, generator 204 attempts to maximize generator loss 214.

System 200 provides significant advantages over conventional machine learning. Specifically, system may process both text and image data. First, system 200 includes architecture and training strategy that enables compelling text to image synthesis. For example, system 200 may train on a subset of training categories (e.g., subsets within samples 206 and 210), wherein the subsets are linked to specific characteristics (e.g., section and/or content). For example, system 200 consists of generator 204 and discriminator 212 that compete in a two player minimax game for each subset of training categories. For example, for each subset discriminator 212 tries to distinguish real training data for each subset (e.g., samples 210) from synthetic data for each subset (e.g., samples 206), and generator 204 tries to fool discriminator 212. For example, system 200 may include text encoders/decoders and image encoders/decoders for each subset.

System 200 may be trained subset features encoded by a hybrid character-level convolutional recurrent neural network. Both generator 204 and discriminator 212 perform feed-forward inference conditioned on the subset feature. In system 200, discriminator 212 observes two kinds of inputs: real images with matching text, and synthetic images with arbitrary text. System 200 implicitly separates two sources of error: unrealistic images (for any text), and realistic images of the wrong class that mismatch the conditioning information. System 200 separates these error sources. For example, in addition to the real/fake inputs to discriminator 212 during training, system 200 adds a third type of input consisting of real images with mismatched text, which discriminator 212 learns to score as fake. By learning to optimize image/text matching in addition to the image realism, discriminator 212 provides an additional signal to the generator.

It should be noted that additionally or alternatively, the system may use variational autoencoders to generate content. For example, a variational autoencoder provides a probabilistic manner for describing an observation in latent space. As such, instead of using an encoder which outputs a single value to describe each latent state attribute, the system may determine a probability distribution for each latent attribute. To describe the observation in a probabilistic manner, the system determines a probability distribution for each latent attribute. During decoding from the latent state, the system randomly samples from each latent state distribution to generate a vector as input for the decoder. Accordingly, the variational autoencoder provides a model that outputs a range of possible values (e.g., a statistical distribution). These values can then be randomly sampled by the decoder. This creates a continuous, smooth latent space representation in which values that are nearby to one another in latent space create similar reconstructions.

Figure 3:
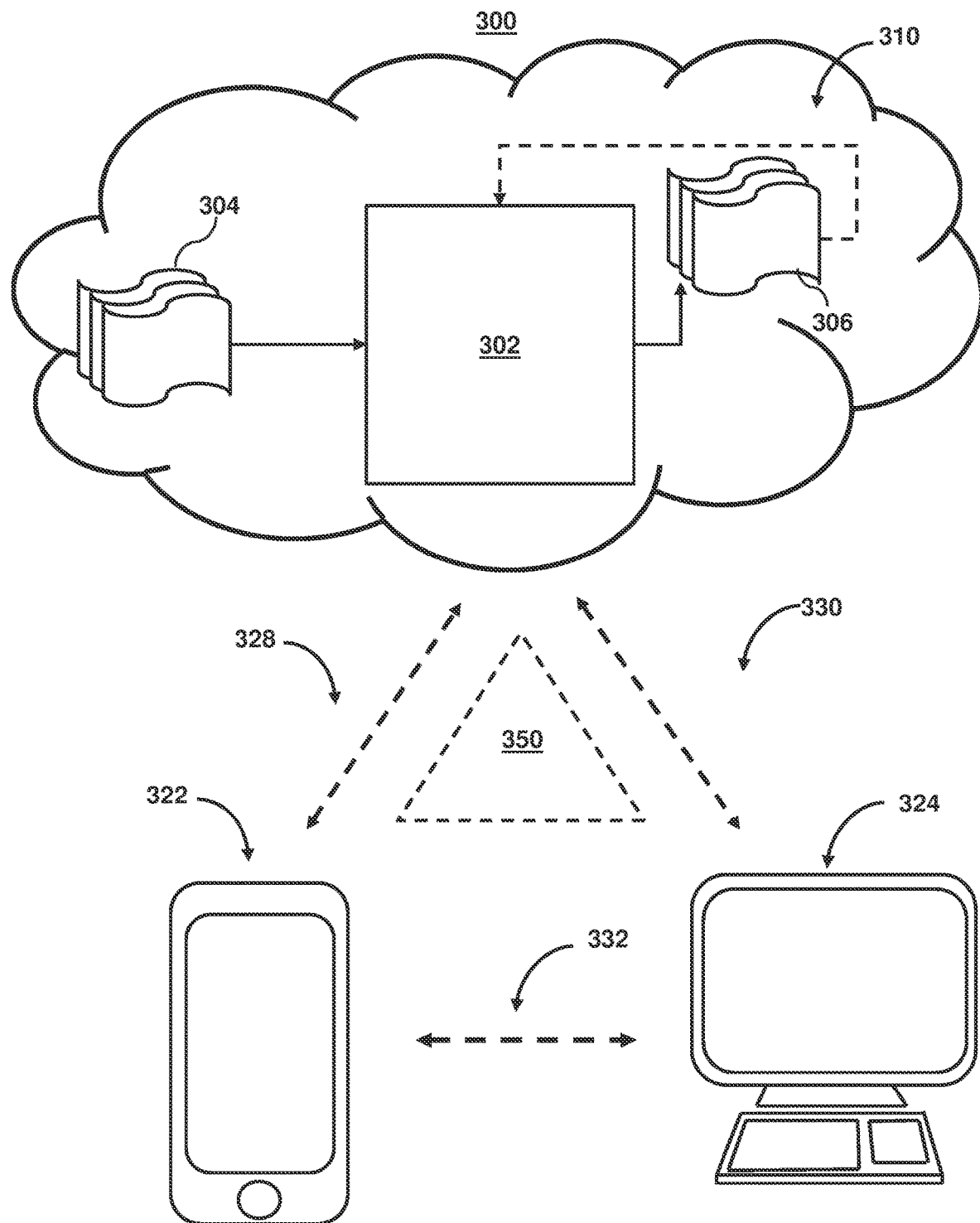
FIG. 3 is an illustrative system for generating alternative content using generative adversarial networks implemented in an application programming interface layer, in accordance with one or more embodiments.

FIG. 3 is an illustrative system for generating alternative content using generative adversarial networks implemented in an application programming interface layer, in accordance with one or more embodiments. For example, system 300 may represent the components used for generating alternative content based on initial content, as shown in FIGS. 1A-1B and using a generative adversarial network (as shown in FIG. 2). As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to runs processes to determine alternative content. Cloud components 310 may also include cloud-based input/output circuitry configured to display alternative content.

Cloud components 310 may include model 302, which may be a machine learning model (e.g., as described in FIG. 2). Model 302 may take inputs 304 and provide outputs 306. The inputs may include multiple datasets such as a training dataset and a test dataset. Each of the plurality of datasets (e.g., inputs 304) may include data subsets related to user data, original content, and/or alternative content. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known alternative content for the first labeled feature input. The system may then train the first machine learning model to classify the first labeled feature input with the known alternative content.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., alternative content).

In some embodiments, model 302 may predict alternative content. For example, the system may determine that particular characteristics are more likely to be indicative of a type of alternative content. In some embodiments, the model (e.g., model 302) may automatically perform actions based on output 306. In some embodiments, the model (e.g., model 302) may not perform any actions on a user's account. The output of the model (e.g., model 302) is only used to decide which location and/or a delivery time offset to select.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby®, Java®, PHP®, and JavaScript®. SOAP Web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka®, RabbitMQ®, etc.). API layer 350 may use incipient usage of new communications protocols such as Grpc®, Thrift®, etc.

In some embodiments, the system architecture may use an open API approach. In such cases, API layer 350 may use commercial or open source API Platforms and their modules. API layer 350 may use developer portal. API layer 350 may use strong security constraints applying WAF and DDOS protection, and API layer 350 may use RESTful APIs as standard for external integration.

Figure 4:
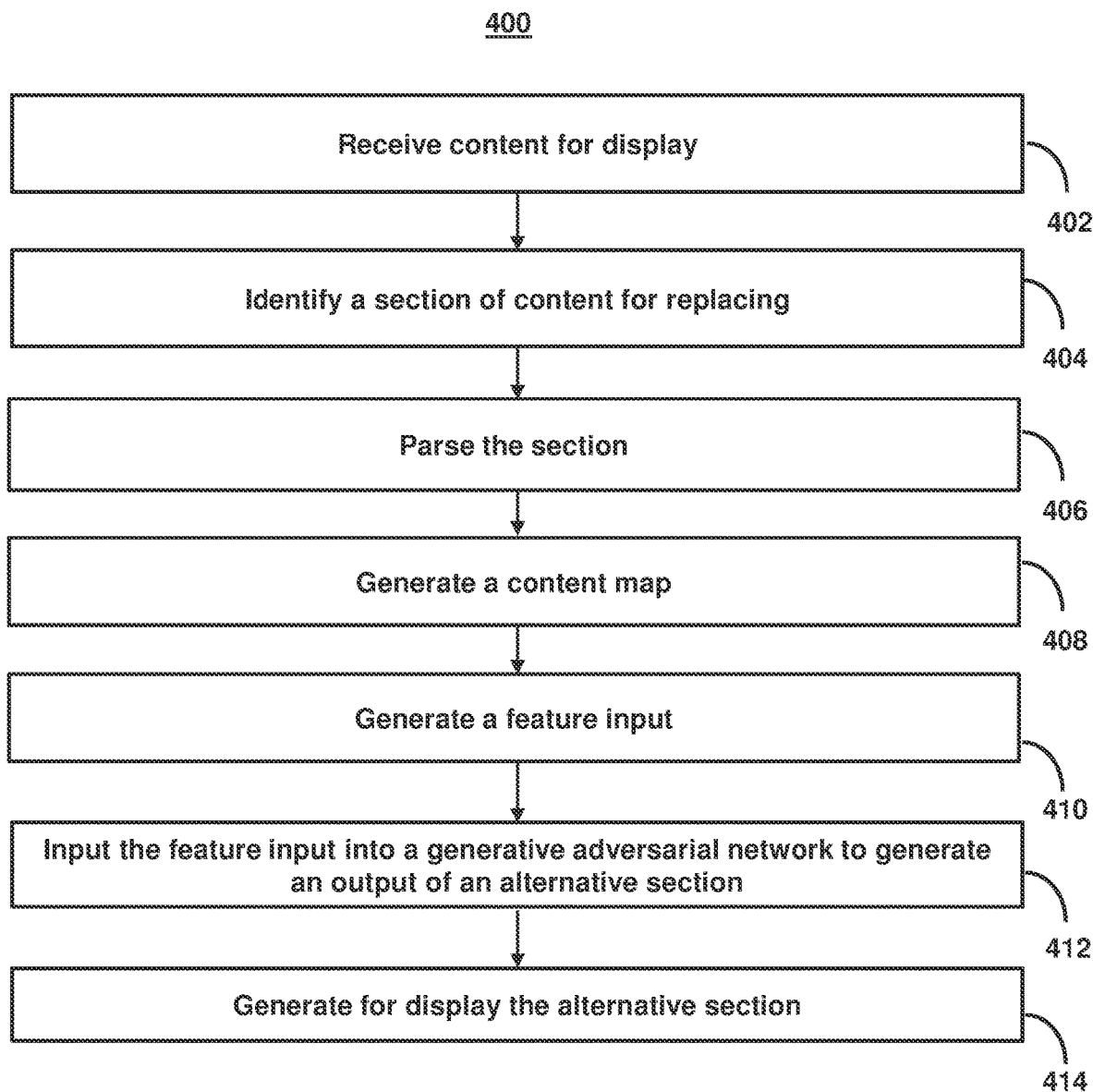
FIG. 4 shows a flowchart of the steps involved in generating alternative content using generative adversarial networks implemented in an application programming interface layer, in accordance with one or more embodiments.

FIG. 4 shows a flowchart of the steps involved in transmitting digital notifications, in accordance with one or more embodiments. For example, process 400 may represent the steps taken by one or more devices as shown in FIGS. 1-3.

At step 402, process 400 (e.g., using one or more components in system 300 (FIG. 3)) receives content for display. For example, the system may receive content for display, in a user interface of a user device, to a user, wherein the content includes a plurality of sections.

At step 404, process 400 (e.g., using one or more components in system 300 (FIG. 3)) identifies a section of content for replacing. For example, the system may identify a section of the plurality of sections as having a section characteristic, wherein the section characteristic is indicative of the section being of interest to the user. In some embodiments, identifying the section of the plurality of sections as having the section characteristic may comprise identifying a plurality of section characteristics in the section and comparing each of the plurality of section characteristics to user characteristics in a user profile to determine a match. For example, the system may search each section for section characteristics (e.g., keywords, genre, authors, etc.) that may match preferences in a user profile. In some embodiments, when replacing a section, the system may switch specific words, objects, images, and/or rewrite the section.

At step 406, process 400 (e.g., using one or more components in system 300 (FIG. 3)) parses the section. For example, the system may parse the section for a content characteristic and metadata describing the content characteristic. For example, in some embodiments, the content characteristic may be an alphanumeric text string and the metadata describing the content characteristic that comprises a category of an object corresponding to the alphanumeric text string. For example, the metadata may indicate a context of the content characteristic (e.g., the metadata may indicate the circumstances that form the setting for an event, statement, or idea, and in terms of which it can be fully understood and assessed, related to the content characteristic).

In some embodiments, parsing the section for the content characteristic may comprise retrieving a list of content characteristics, comparing objects in the section to the list of content characteristics, and identifying the content characteristic based on matching an object of the objects to a listed content characteristic. For example, the list of content characteristics may indicate content characteristics that may be replaced. The system may search the section for these content characteristics.

At step 408, process 400 (e.g., using one or more components in system 300 (FIG. 3)) generates a content map. For example, the system may generate a content map for the section based on the parsing, wherein the content map indicates a position of the content characteristic in the section.

At step 410, process 400 (e.g., using one or more components in system 300 (FIG. 3)) generates a feature input. For example, the system may generate a feature input based on the content map and the metadata. For example, the feature input may comprise a vector array of values indicative of the content map and the metadata.

At step 412, process 400 (e.g., using one or more components in system 300 (FIG. 3)) inputs the feature input into a generative adversarial network to generate an output of an alternative section. For example, the system may input the feature input into a generative adversarial network, wherein the generative adversarial network is trained to generate an output of an alternative section, wherein the alternative section corresponds to the content map and has an alternative content characteristic at the position. In some embodiments, the content characteristic may be textual data and the alternative content characteristic may be different textual data. Alternatively, the content characteristic may be textual data and the alternative content characteristic may be image data, and wherein the generative adversarial network is trained to translate the textual data into the image data.

In some embodiments, the generative adversarial network is further trained to generate an additional output of an additional alternative section, wherein the additional alternative section corresponds to an alternative position outside the content map, and wherein the additional alternative section is simultaneously displayed with the alternative section. For example, the system may generate additional alternative sections (e.g., section 110 (FIG. 1B)).

In some embodiments, the generative adversarial network may further comprise an autoregressive language model that performs natural language processing using pre-trained language representations. For example, autoregressive language models use deep learning to produce human-like text. For example, the autoregressive model may specify that an output variable depends linearly on its own previous values and on a stochastic term (e.g., an imperfectly predictable term). The model is therefore in the form of a stochastic difference equation (or recurrence relation which should not be confused with differential equation). Through the use of this model, the system produces alternative text in a section that is more human-like and preserves a natural tone and/or cadence.

In some embodiments, the system may parse the alternative section for the section characteristic. For example, the system may perform an additional check to ensure that the original section characteristics that were of likely interest to the user are still present in the alternative section. If not, the system may generate a new alternative section. In response to identification of the section characteristic in the alternative section, the alternative section is generated for display.

At step 414, process 400 (e.g., using one or more components in system 300 (FIG. 3)) generates for display the alternative section. For example, the system may generate for display, in the user interface of the user device, the alternative section, wherein the alternative section replaces the section in the plurality of sections of the content.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-3 could be used to perform one of more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving content for display; replacing the content with alternative content generated using a generative adversarial network; and generating for display, the alternative content.

2. A method, the method comprising: receiving content for display, in a user interface of a user device, to a user, wherein the content includes a plurality of sections; identifying a section of the plurality of sections as having a section characteristic, wherein the section characteristic is indicative of the section being of interest to the user; parsing the section for a content characteristic and metadata describing the content characteristic; generating a content map for the section based on the parsing, wherein the content map indicates a position of the content characteristic in the section; generating a feature input based on the content map and the metadata; inputting the feature input into a generative adversarial network, wherein the generative adversarial network is trained to generate an output of an alternative section, wherein the alternative section corresponds to the content map and has an alternative content characteristic at the position; and generating for display, in the user interface of the user device, the alternative section, wherein the alternative section replaces the section in the plurality of sections of the content.

3. The method of embodiment 2, wherein identifying the section of the plurality of sections as having the section characteristic further comprises: identifying a plurality of section characteristics in the section; and comparing each of the plurality of section characteristics to user characteristics in a user profile to determine a match.

4. The method of embodiment 2, wherein the content characteristic is textual data and the alternative content characteristic is different textual data.

5. The method of embodiment 2, wherein the content characteristic is textual data and the alternative content characteristic is image data, and wherein the generative adversarial network is trained to translate the textual data into the image data.

6. The method of embodiment 2, wherein the content characteristic is an alphanumeric text string and the metadata describing the content characteristic comprises a category of an object corresponding to the alphanumeric text string.

7. The method of embodiment 2, wherein the generative adversarial network is further trained to generate an additional output of an additional alternative section, wherein the additional alternative section corresponds an alternative position outside the content map, and wherein the additional alternative section is simultaneously displayed with the alternative section.

8 The method of embodiment 2, wherein the generative adversarial network further comprises an autoregressive language model.

9. The method of embodiment 2, further comprising parsing the alternative section for the section characteristic, wherein the alternative section is generated for display in response to identification of the section characteristic in the alternative section.

10. The method of embodiment 2, wherein the metadata indicates a context of the content characteristic.

11. The method of embodiment 2, wherein parsing the section for the content characteristic further comprises: retrieving a list of content characteristics; comparing objects in the section to the list of content characteristics; and identifying the content characteristic based on matching an object of the objects to a listed content characteristic.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A method for generating content, the method comprising:
   receiving content for display, in a user interface of a user device associated with a user, wherein the content includes a plurality of sections;
   identifying a section of the plurality of sections as having a section characteristic indicative of being of interest to the user;
   parsing the section for a content characteristic and metadata associated with the content characteristic;
   generating a content map for the section based on parsing the section, wherein the content map indicates a position of the content characteristic in the section;
   generating a feature input based on the content map and the metadata;
   inputting the feature input into a model to generate an output of an alternative section located at an alternative position as to positions of the content map, wherein the model is trained on labeled feature inputs indicating (i) content maps indicating positions of content characteristics and the metadata associated with the content characteristics and (ii) alternative content corresponding to alternative positions of the positions of the content characteristics; and
   generating for display, in the user interface of the user device, the alternative section at the alternative position.

2. The method of claim 1, wherein identifying the section of the plurality of sections as having the section characteristic further comprises:
   identifying a plurality of section characteristics in the section; and
   comparing each of the plurality of section characteristics to user characteristics in a user profile to determine a match.

3. The method of claim 1, wherein the content characteristic is textual data and the alternative section is associated with an alternative content characteristic that is different textual data.

4. The method of claim 1, wherein the content characteristic is textual data and the alternative section is associated with an alternative content characteristic of image data, and wherein the model is trained to translate the textual data into the image data.

5. The method of claim 1, wherein the content characteristic is an alphanumeric text string and the metadata describing the content characteristic comprises a category of an object corresponding to the alphanumeric text string.

6. The method of claim 1, further comprising:
   generating an additional output of an additional alternative section, via the model, wherein the additional alternative section corresponds to the content map and has an alternative content characteristic at the position; and
   generating for display, in the user interface, the additional alternative section, wherein the additional alternative section replaces the section in the plurality of sections of the content.

7. The method of claim 1, wherein the model further comprises an autoregressive language model that performs natural language processing using pre-trained language representations.

8. The method of claim 1, further comprising parsing the alternative section for the section characteristic, wherein the alternative section is generated for display in response to identifying the section characteristic in the alternative section, wherein the section characteristic in the alternative section is identified.

9. The method of claim 1, wherein the metadata indicates a context of the content characteristic.

10. The method of claim 1, wherein parsing the section for the content characteristic further comprises:
    retrieving a list of content characteristics;
    comparing objects in the section to the list of content characteristics; and identifying the content characteristic based on matching an object of the objects to a listed content characteristic.

11. One or more non-transitory, computer-readable media for generating content comprising instructions that, when executed by one or more processors, cause operations comprising:
- receiving content for display, in a user interface of a user device associated with a user, wherein the content includes a plurality of sections;
- identifying a section of the plurality of sections as having a section characteristic indicative of being of interest to the user;
- parsing the section for a content characteristic and metadata associated with the content characteristic;
- generating a content map for the section based on parsing the section, wherein the content map indicates a position of the content characteristic in the section;
- generating a feature input based on the content map and the metadata;
- inputting the feature input into a model to generate an output of an alternative section located at an alternative position as to positions of the content map, wherein the model is trained on labeled feature inputs indicating (i) content maps indicating positions of content characteristics and the metadata associated with the content characteristics and (ii) alternative content corresponding to alternative positions of the positions of the content characteristics; and
- generating for display, in the user interface of the user device, the alternative section at the alternative position.

12. The one or more non-transitory, computer-readable media of claim 11, wherein the instructions for identifying the section of the plurality of sections as having the section characteristic further cause the one or more processors to perform operations comprising:
- identifying a plurality of section characteristics in the section; and
- comparing each of the plurality of section characteristics to user characteristics in a user profile to determine a match.

13. The one or more non-transitory, computer-readable media of claim 11, wherein the content characteristic is textual data and the alternative section is associated with an alternative content characteristic that is different textual data.

14. The one or more non-transitory, computer-readable media of claim 11, wherein the content characteristic is textual data and the alternative section is associated with an alternative content characteristic of image data, and wherein the model is trained to translate the textual data into the image data.

15. The one or more non-transitory, computer-readable media of claim 11, wherein the content characteristic is an alphanumeric text string and the metadata describing the content characteristic comprises a category of an object corresponding to the alphanumeric text string.

16. The one or more non-transitory, computer-readable media of claim 11, wherein the instructions further cause the one or more processors to perform operations comprising:
- generating an additional output of an additional alternative section, via the model, wherein the additional alternative section corresponds to the content map and has an alternative content characteristic at the position; and
- generating for display, in the user interface, the additional alternative section, wherein the additional alternative section replaces the section in the plurality of sections of the content.

17. The one or more non-transitory, computer-readable media of claim 11, wherein the model further comprises an autoregressive language model that performs natural language processing using pre-trained language representations.

18. The one or more non-transitory, computer-readable media of claim 11, wherein the instructions further cause the one or more processors to parse the alternative section for the section characteristic, wherein the alternative section is generated for display in response to identification of the section characteristic in the alternative section.

19. The one or more non-transitory, computer-readable media of claim 11, wherein the instructions for parsing the section for the content characteristic further cause the one or more processors to perform operations comprising:
- retrieving a list of content characteristics;
- comparing objects in the section to the list of content characteristics; and
- identifying the content characteristic based on matching an object of the objects to a listed content characteristic.

20. A system for generating alternative content, the system comprising:
- a model, wherein the model is trained on labeled feature inputs indicating (i) content maps indicating positions of content characteristics and metadata associated with the content characteristics and (ii) alternative content corresponding to first alternative positions of first positions of the content characteristics to generate outputs of alternative sections corresponding to second alternative positions; and
- one or more processors configured to:
  - receive content for display, in a user interface of a user device associated with a user, wherein the content includes a plurality of sections;
  - identify a section of the plurality of sections as having a section characteristic that is indicative of being of interest to the user;
  - parse the section for a content characteristic and the metadata associated with the content characteristic, wherein the metadata indicates a context of the content characteristic;
  - generate a content map for the section based on parsing the section, wherein the content map indicates a position of the content characteristic in the section;
  - generate a feature input based on the content map and the metadata;
  - input the feature input into the model to generate an output of an alternative position as to positions of the content map; and
  - generating for display, in the user interface of the user device, an alternative section at the alternative position.

* * * * *